(12) United States Patent
Shetty et al.

(10) Patent No.: US 9,164,753 B2
(45) Date of Patent: Oct. 20, 2015

(54) GENERATING SOFTWARE UPDATES

(71) Applicants: Mahidhar K Shetty, Bangalore (IN); Preetpal Singh, Bangalore (IN); Biju Balachandran, Bangalore (IN)

(72) Inventors: Mahidhar K Shetty, Bangalore (IN); Preetpal Singh, Bangalore (IN); Biju Balachandran, Bangalore (IN)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 13/736,253

(22) Filed: Jan. 8, 2013

(65) Prior Publication Data

US 2014/0196020 A1 Jul. 10, 2014

(51) Int. Cl.
*G06F 9/44* (2006.01)
*G06F 9/445* (2006.01)

(52) U.S. Cl.
CPC ... *G06F 8/65* (2013.01); *G06F 8/68* (2013.01)

(58) Field of Classification Search
USPC .......................................................... 717/171
See application file for complete search history.

(56) References Cited

U.S. PATENT DOCUMENTS

| | | | |
|---|---|---|---|
| 4,860,203 A | 8/1989 | Corrigan et al. | |
| 5,903,897 A | 5/1999 | Carrier, III et al. | |
| 6,526,426 B1* | 2/2003 | Lakritz | 715/264 |
| 6,610,103 B2 | 8/2003 | Ehrman et al. | |
| 7,370,244 B2 | 5/2008 | Breitling et al. | |
| 7,437,722 B2 | 10/2008 | Poole | |
| 7,536,684 B2 | 5/2009 | Patrizio et al. | |
| 7,689,904 B2 | 3/2010 | Ritter | |
| 7,711,670 B2* | 5/2010 | Roediger | 706/46 |
| 7,788,640 B2 | 8/2010 | Grimaldi | |
| 7,797,334 B2* | 9/2010 | Srivastava et al. | 717/121 |
| 8,234,248 B2 | 7/2012 | Karimisetty et al. | |
| 2002/0184619 A1* | 12/2002 | Meyerson | 717/173 |
| 2003/0106051 A1* | 6/2003 | Morrison et al. | 717/170 |
| 2006/0100853 A1* | 5/2006 | McEntee et al. | 704/9 |
| 2006/0156278 A1* | 7/2006 | Reager | 717/104 |
| 2007/0028056 A1 | 2/2007 | Harris | |
| 2007/0192671 A1* | 8/2007 | Rufener | 715/500 |
| 2008/0172660 A1* | 7/2008 | Arning et al. | 717/144 |
| 2009/0217240 A1* | 8/2009 | Motoyama et al. | 717/114 |
| 2010/0131939 A1 | 5/2010 | Hieb et al. | |
| 2011/0023021 A1 | 1/2011 | Miyazaki | |
| 2011/0035740 A1 | 2/2011 | Powell et al. | |
| 2012/0124561 A1 | 5/2012 | Escribano | |
| 2012/0174087 A1 | 7/2012 | Bentzien et al. | |

(Continued)

OTHER PUBLICATIONS

Erwig et al. "A Rule-Based Language for Programming Software Updates", Oct. 2002, ACM.*

(Continued)

*Primary Examiner* — Anna Deng
*Assistant Examiner* — Junchun Wu
(74) *Attorney, Agent, or Firm* — Fish & Richardson P.C.

(57) ABSTRACT

Techniques for generating a software update include determining changes between a previous version of a software package and a new version of the software package. Whether each change can be implemented as automatic correction instructions that can be executed by a client computer system is determined. Automatic correction instructions are generated for changes that can be implemented as automatic correction instructions. Manual correction instructions are generated for changes that cannot be implemented as automatic correction instructions, including, for each of those changes, identifying a corresponding template for a text string for the change from a repository of templates and including the text string in the manual correction instruction.

17 Claims, 4 Drawing Sheets

(56) References Cited

U.S. PATENT DOCUMENTS

2012/0311529 A1* 12/2012 Beveridge et al. ............ 717/107
2014/0052680 A1* 2/2014 Nitz et al. ....................... 706/46
2014/0074806 A1* 3/2014 Koren et al. .................. 707/694

OTHER PUBLICATIONS

Bunke et al. "A Tool for Versatile and User-friendly Document Correction", 1997, IEEE.*

* cited by examiner

GENERATING SOFTWARE UPDATES

TECHNICAL BACKGROUND

This disclosure relates to correcting computer software, and more particularly, to updating computer software by automatically generated correction instructions.

BACKGROUND

An enterprise software developer can distribute software updates in various ways. One way is to distribute an entirely new version of the object or source code. Another way is to distribute correction instructions. For example, a patch is a piece of software designed to update software or its supporting data. Some enterprise software is developed on a common platform, which allows software updates to be deployed in a common way according to the common platform.

In some software environments, an enterprise software developer can distribute correction instructions via a central computer system. The developer uploads the correction instructions to the central computer system, and customers can then download the correction instructions and apply the correction instructions. In this manner, the customers can avoid a costly upgrade to the software of downloading entirely new versions of the software.

SUMMARY

The present disclosure relates to computer-implemented methods, software, and systems for generating software updates for a software package. In some implementations, changes between a previous version of the software package and a new version of the software package are determined. Whether each change can be implemented as one or more automatic correction instructions that can be executed by a client computer system is determined. Automatic correction instructions are generated for changes that can be implemented as automatic correction instructions. Manual correction instructions are generated for changes that cannot be implemented as automatic correction instructions, including, for each of those changes, identifying a corresponding template for a text string for the change from a repository of templates and including the text string in the manual correction instruction.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations includes sending the automatic correction instructions, the manual correction instructions, and update instructions to a computer system storing the software package, wherein the computer system is configured to executing the update instructions, thereby causing the computer system to execute the automatic correction instructions to update the software package and to display the manual correction instructions.

In a second aspect combinable with any of the general implementations, determining whether the change can be implemented as one or more automatic correction instructions that can be executed by a client computer system comprises: determining whether the change is a source code change or a change to a specified object on a list of objects; if the change is a source code change or a change to a specified object, determining that the change can be implemented in automatic correction instructions; and if the change is not a source code change or a change to a specified object, determining that the change cannot be implemented in automatic correction instructions.

In a third aspect combinable with any of the general implementations, generating one or more automatic correction instructions for the one or more first changes comprises generating the automatic correction instructions so that, when executed by a computer system, the computer system will modify a stored copied of the previous version of the software package to correspond to the new version of the software package as specified by the change.

In a fourth aspect combinable with any of the general implementations, identifying a corresponding template for a text string for the change from a repository of templates and including the text string in the manual correction instructions comprises populating the text string from the corresponding template with information specific to the change.

In a fifth aspect combinable with any of the general implementations, the corresponding template includes a plurality of different text strings each in a different language, and wherein including the text string in the manual correction instructions comprises selecting one of the different text strings to match a specified language of a computer system requesting the software update In a sixth aspect combinable with any of the general implementations, the templates in the repository of templates are specified at a uniform level of granularity.

A seventh aspect combinable with any of the general implementations includes determining that a first change lacks a corresponding template in the repository of templates; and generating a new template for the first change by analyzing the first change and applying natural language processing.

Various implementations of a computing system according to the present disclosure may provide one or more of the following advantages. The manual effort of a software developer creating a software update can be reduced by automating creation of manual correction instructions. The text of some manual correction instructions can be written once by experts and saved for various references so as to maintain consistency and certain standards, e.g., for clarity or granularity, for manual correction instructions. Translation of the text of manual correction instructions need only be completed once instead of potentially many times, saving time and money.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
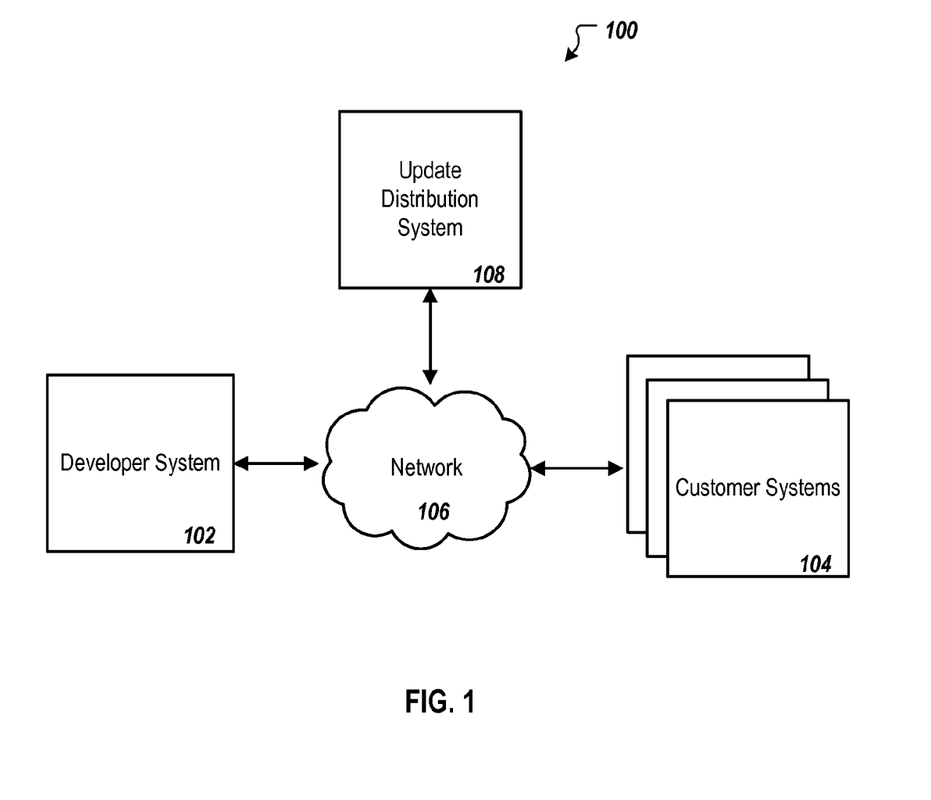
FIG. 1 is a block diagram of an example computing environment 100 for distributing software updates.

FIG. 1 is a block diagram of an example computing environment 100 for distributing software updates. A developer uses a developer system 102 of one or more computers to develop software used on customer systems 104 of one or more computers. The developer system sends software updates to the customer systems over a data communications network 106, e.g., the Internet.

In some implementations, the developer distributes software updates via an update distribution system 108 of one or more computers. For example, the developer can develop software on an enterprise software platform and then distribute software updates in accordance with update procedures for the enterprise software platform.

The developer can create the software updates on the developer system or the update distribution system or both. For example, the developer can makes changes to the software on the developer system and then send new and old versions of the software to the update distribution system which then develops the software update as a package of executable code or textual instructions or both. The update distribution system can then distribute the software update to the customer systems.

Figure 2:
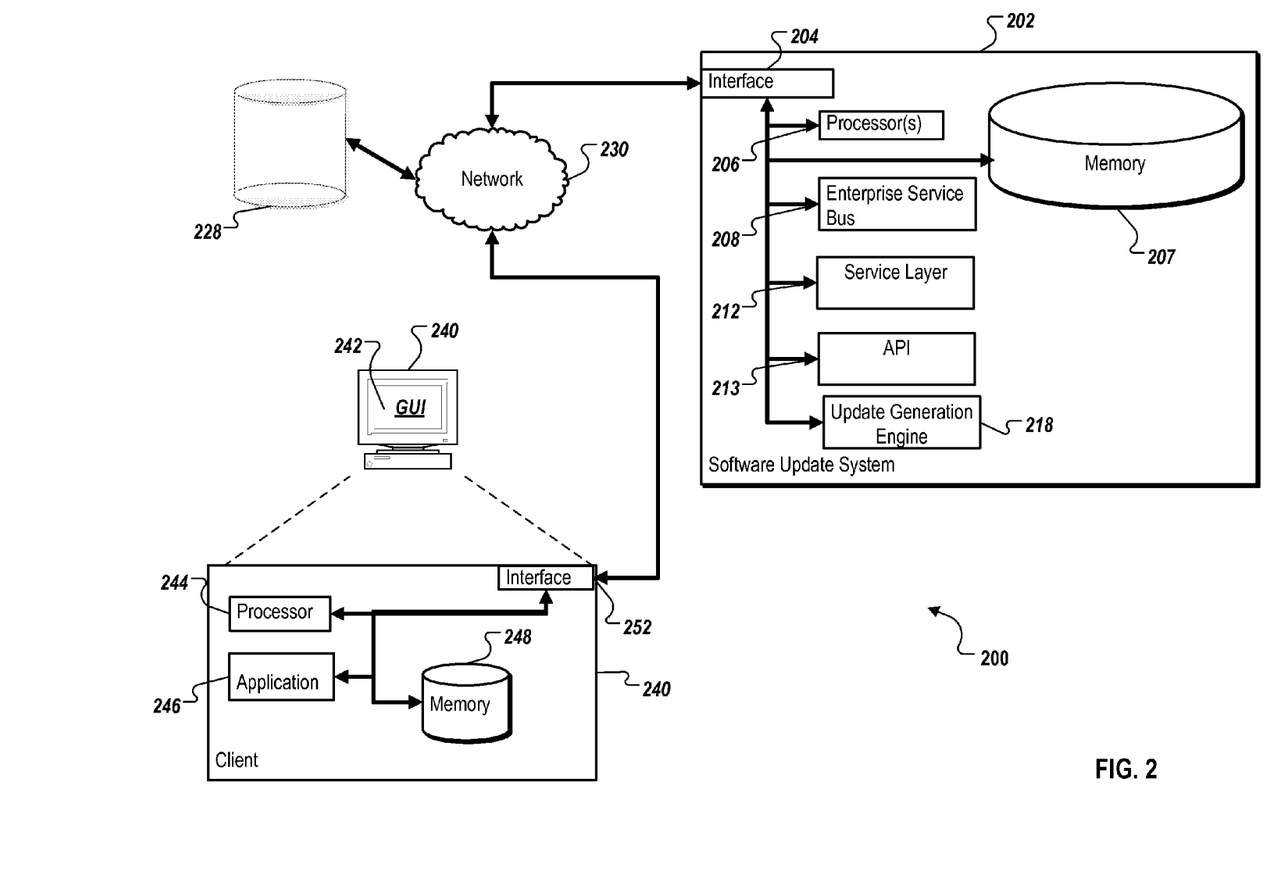
FIG. 2 illustrates an example distributed computing system 200 for performing a time period change analysis.

FIG. 2 illustrates an example distributed computing system 200 for performing a time period change analysis. For example, the illustrated distributed computing system 200 includes or is communicably coupled with a software update system 202, a client computing system 240, and a repository 228, at least some of which communicate across a network 230. In general, the software update system 202 is any server that stores one or more hosted applications, such as for example, a change analysis engine update generation engine 218, where at least a portion of the hosted applications are executed via requests and responses sent to users or clients within and communicably coupled to the illustrated distributed computing system 200 of FIG. 2. The software update system can be the update distribution system 108 of FIG. 1, for example.

In some aspects, computing system 200 generates a software update. In some implementations, generating the software update can include determining changes between a previous version of the software package and a new version of the software package. For each change, computing system 200 determines whether the change can be implemented as one or more automatic correction instructions that can be executed by a client computer system. Computing system 200 generates automatic correction instructions if possible and generates manual correction instructions otherwise by identifying a corresponding template for a text string for the change from a repository of templates and including the text string in the manual correction instruction.

In some examples, the software update system 102 may store a plurality of various hosted applications, while in some examples, the software update system 102 may be a dedicated server meant to store and execute only a single hosted application. In some instances, the software update system 202 may comprise a web server, where the hosted applications represent one or more web-based applications accessed and executed via the network 230 by the client computing system 240 to perform the programmed tasks or operations of the hosted application.

At a high level, the software update system 202 comprises an electronic computing device operable to receive, transmit, process, store, or manage data and information associated with the distributed computing system 200. Specifically, the software update system 202 illustrated in FIG. 2 is responsible for receiving application requests from one or more client applications associated with the client computing system 240 of the distributed computing system 200 and responding to the received requests by processing said requests in the associated hosted application, and sending the appropriate response from the hosted application back to the requesting client application. In addition to requests from the client computing system 240 illustrated in FIG. 2, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 2 illustrates a single software update system 202, the distributed computing system 200 can be implemented using two or more servers, as well as computers other than servers, including a server pool. In some examples, the software update system 202 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

As mentioned above, the software update system 202 includes an update generation engine 218. In summary, the update generation engine determining changes between a previous version of the software package and a new version of the software package, and generates automatic correction instructions if possible and generates manual correction instructions for other changes.

The software update system 202 further includes an interface 204. Although illustrated as a single interface 204 in FIG. 2, two or more interfaces 204 may be used according to particular needs, desires, or particular implementations of the example distributed computing system 200. The interface 204 is used by the software update system 202 for communicating with other systems in a distributed environment—including within the example distributed computing system 200—connected to the network 230; for example, the client computing system 240 as well as other systems communicably coupled to the network 230 (not illustrated). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated example distributed computing system 200.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The software update system 202 further includes a processor 206. Although illustrated as a single processor 206 in FIG. 2, two or more processors may be used according to particular needs, desires, or particular implementations of the example distributed computing system 200. The processor 206 may be a central processing unit (CPU), a blade, an application specific integrated circuit (ASIC), a field-programmable gate array (FPGA), or another suitable component. Generally, the processor 206 executes instructions and manipulates data to perform the operations of the enterprise server computing system 202. Specifically, the processor 206 executes the functionality required to receive and respond to requests from the client computing system 240.

The software update system 202 also includes a memory 207. Although illustrated as a single memory 207 in FIG. 2, two or more memories may be used according to particular needs, desires, or particular implementations of the example distributed computing system 200. While memory 207 is illustrated as an integral component of the enterprise server computing system 202, in some implementations, the memory 207 can be external to the enterprise server computing system 202 and/or the example distributed computing system 200. The memory 207 may include any memory or database module and may take the form of volatile or non-volatile memory including, without limitation, magnetic media, optical media, random access memory (RAM), read-only memory (ROM), removable media, or any other suitable local or remote memory component. The memory 207 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the software update system 202. Additionally, the memory 207 may include any other appropriate data, such as VPN applications, firmware logs and policies, firewall policies, a security or access log, print or other reporting files, as well as others.

The software update system 202 further includes a service layer 212. The service layer 212 provides software services to the example distributed computing system 200. The functionality of the software update system 202 may be accessible for all service consumers using this service layer. For example, in one implementation, the client computing system 240 can utilize the service layer 212 to communicate with the update generation engine 218. Software services provide reusable, defined business functionalities through a defined interface. For example, the interface may be software written in extensible markup language (XML) or other suitable language. While illustrated as an integrated component of the software update system 202 in the example distributed computing system 200, alternative implementations may illustrate the service layer 212 as a stand-alone component in relation to other components of the example distributed computing system 200. Moreover, any or all parts of the service layer 212 may be implemented as child or sub-modules of another software module, enterprise application, or hardware module without departing from the scope of this disclosure.

The software update system 202 further includes an application programming interface (API) 213. In some implementations, the API 213 can be used to interface between the update generation engine 218 and one or more components of the software update system 202 or other components of the example distributed computing system 200, both hardware and software. For example, in some implementations, the update generation engine 218 can utilize the API 213 to communicate with the client computing system 240. The API 213 may include specifications for routines, data structures, and object classes. The API 213 may be either computer language independent or dependent and refer to a complete interface, a single function, or even a set of APIs. While illustrated as an integrated component of the software update system 202 in the example distributed computing system 200, alternative implementations may illustrate the API 213 as a stand-alone component in relation to other components of the example distributed computing system 200. Moreover, any or all parts of the API 213 may be implemented as child or sub-modules of another software module, enterprise application, or hardware module without departing from the scope of this disclosure.

The client computing system 240 may be any computing device operable to connect to or communicate with at least the software update system 202 using the network 130. In general, the client computing system 240 comprises a computer operable to receive, transmit, process, and store any appropriate data associated with the example distributed computing system 200. The illustrated client computing system 240 further includes an application 246. The application 246 is any type of application that allows the client computing system 240 to request and view content on the client computing system 240. In some implementations, the application 246 can be and/or include a web browser. In some implementations, the application 246 can use parameters, metadata, and other information received at launch to access a particular set of data from the software update system 202. Once a particular application 246 is launched, a user may interactively process a task, event, or other information associated with the software update system 202. Further, although illustrated as a single application 246, the application 246 may be implemented as multiple applications in the client computing system 240.

The illustrated client computing system 240 further includes an interface 252, a processor 244, and a memory 248. The interface 252 is used by the client computing system 240 for communicating with other systems in a distributed environment—including within the example distributed computing system 200—connected to the network 230; for example, the software update system 202 as well as other systems communicably coupled to the network 230 (not illustrated). The interface 252 may also be consistent with the above-described interface 204 of the software update system 202 or other interfaces within the example distributed computing system 200. The processor 244 may be consistent with the above-described processor 206 of the software update system 202 or other processors within the example distributed computing system 200. Specifically, the processor 244 executes instructions and manipulates data to perform the operations of the client computing system 240, including the functionality required to send requests to the software update system 202 and to receive and process responses from the software update system 202. The memory 248 may be consistent with the above-described memory 207 of the enterprise server computing system 202 or other memories within the example distributed computing system 200 but storing objects and/or data associated with the purposes of the client computing system 240.

Further, the illustrated client computing system 240 includes a GUI 242. The GUI 242 interfaces with at least a portion of the example distributed computing system 200 for any suitable purpose, including generating a visual representation of a web browser. In particular, the GUI 242 may be used to view and navigate various web pages located both internally and externally to the software update system 202.

Generally, through the GUI 242, an enterprise server computing system 202 user is provided with an efficient and user-friendly presentation of data provided by or communicated within the example distributed computing system 200.

There may be any number of client computing systems 240 associated with, or external to, the example distributed computing system 200. For example, while the illustrated example distributed computing system 200 includes one client computing system 240 communicably coupled to the software update system 202 using network 230, alternative implementations of the example distributed computing system 200 may include any number of client computing systems 240 suitable for the purposes of the example distributed computing system 200. Additionally, there may also be one or more client computing systems 240 external to the illustrated portion of the example distributed computing system 200 that are capable of interacting with the example distributed computing system 200 using the network 230. Moreover, while the client computing system 240 is described in terms of being used by a single user, this disclosure contemplates that many users may use one computer, or that one user may use multiple computers.

The illustrated client computing system 240 is intended to encompass any computing device such as a desktop computer, laptop/notebook computer, wireless data port, smart phone, personal data assistant (PDA), tablet computing device, one or more processors within these devices, or any other suitable processing device. For example, the client computing system 240 may comprise a computer that includes an input device, such as a keypad, touch screen, or other device that can accept user information, and an output device that conveys information associated with the operation of the enterprise server computing system 202 or the client computing system 240 itself, including digital data, visual information, or a GUI 242, as shown with respect to the client computing system 240.

The distributed computing system 200 further includes a repository 228. In some implementations, the repository 228 is an in-memory repository. The repository 228 can be a cloud-based storage medium. For example, the repository 228 can be networked online storage where data is stored on virtualized pools of storage.

With respect to the network 230, generally, the network 230 facilitates wireless or wireline communications between the components of the distributed computing system 200 (i.e., between the computing systems 202 and 240), as well as with any other local or remote computer, such as additional clients, servers, or other devices communicably coupled to network 230 but not illustrated in FIG. 2. The network 230 is illustrated as a single network in FIG. 2, but may be a continuous or discontinuous network without departing from the scope of this disclosure, so long as at least a portion of the network 230 may facilitate communications between senders and recipients. The network 230 may be all or a portion of an enterprise or secured network, while in another instance at least a portion of the network 230 may represent a connection to the Internet.

In some instances, a portion of the network 230 may be a virtual private network (VPN), such as, for example, the connection between the client computing system 240 and the software update system 202. Further, all or a portion of the network 230 can comprise either a wireline or wireless link. Example wireless links may include 802.11a/b/g/n, 802.20, WiMax, and/or any other appropriate wireless link. In other words, the network 230 encompasses any internal or external network, networks, sub-network, or combination thereof operable to facilitate communications between various computing components inside and outside the illustrated distributed computing system 200. The network 230 may communicate, for example, Internet Protocol (IP) packets, Frame Relay frames, Asynchronous Transfer Mode (ATM) cells, voice, video, data, and other suitable information between network addresses. The network 230 may also include one or more local area networks (LANs), radio access networks (RANs), metropolitan area networks (MANs), wide area networks (WANs), all or a portion of the Internet, and/or any other communication system or systems at one or more locations.

Figure 3:
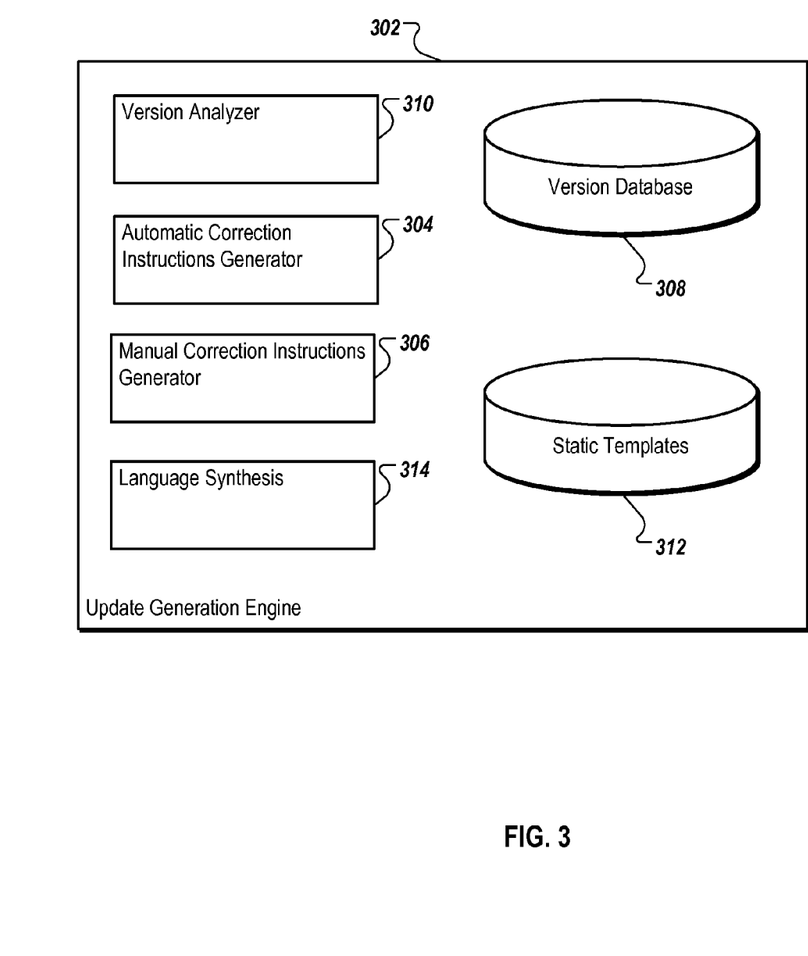
FIG. 3 is a block diagram of an update generation engine 302.

FIG. 3 is a block diagram of an update generation engine 302. The update generation engine can be used in a software update system, e.g., the software update system 202 of FIG. 2.

The update generation engine generates software updates for a software package. When a developer makes changes to the software package, e.g., to fix bugs or add new features, the developer can submit a new version of the software package to a version database 308. The version database includes one or more older versions of the software package. A version analyzer 310 analyzes the new version to determine what changes the designer has made to the software package. The changes can be changes to the source code or to objects used by the software package or other kinds of changes.

A software update can include automatic correction instructions or manual correction instructions or both. Automatic correction instructions are generated by an automatic correction instructions generator 304 and manual correction instructions are generated by a manual correction instructions generator 306.

Automatic correction instructions can be implemented on a customer's system by being executed by the customer's system. For example, automatic correction instructions can be executable code executed by the customer's system requiring little to no intervention by a human system operator. Manual correction instructions require at least some intervention by a system operator. For example, manual correction instructions can be text instructions that a system operator reads and then implements manually.

When the version analyzer determines changes that have been made to the software package, the update generation engine determines, for each change, whether the change can be implemented as automatic correction instructions or not. In some implementations, changes can be implemented as automatic correction instructions only if those changes are related to source code changes or changes to certain classes of objects or both. If the change can be implemented as automatic correction instructions, the automatic correction instructions generator generates the instructions. For example, the automatic correction instructions generator can generate executable code to edit source or object code of the software package.

If the change cannot be implemented as automatic correction instructions, then the manual instructions generator generates manual correction instructions. In some implementations, manual correction instructions are useful to implement changes to certain object types, e.g., tables, structures, domains, data elements, or other changes for which automatic correction instructions are not available.

One way to generate manual correction instructions is to present a user interface element, e.g., a dialog box with a text editor, to a developer who can then manually enter the instructions. This can be time consuming, error prone, and can lead to nonstandard instructions. Moreover, system operators implementing the manual instructions on customer systems can have difficulty following the instructions or spend a burdensome amount of time implementing the instructions.

Another way to generate manual correction instructions is to use static templates stored in a repository 312 of static templates. For each object type that is being changed, the repository stores an associated static template. The static template for an object type includes a standard list of instructions, e.g., as text strings, for the procedure for creation, modification, deletion, or other operations for changing an object of the object type. This is useful, for example, because it can save the developer time from having to manually enter the manual correction instructions. Moreover, this is useful for system operators implemented the manual correction instructions, because the instructions can be made more regular or uniform or both.

The static templates can optionally include instructions in different languages. Typically, the static templates include instructions at a uniform level of granularity, i.e., so that every action that a system operator at the customer system has to perform is described with at least a certain amount of particularity. In this manner, the manual instructions generator can generate manual instructions that can be easier to implement by system operators because gaps in the instructions, e.g., resulting from overly broad descriptions of the tasks needed to be completed, are reduced.

In some implementations, a software update is stored at a software update system with references to the static templates, and when a particular customer system requests the update, the software update system generates at run time a particular instance of the software update tailored to that customer, e.g., in a specified language for that customer or to update a specific version of the software package of the customer system. In some implementations, the software update system generates and stores software updates for various systems when the development submits a new version, and then responds to requests for the update by selecting the appropriate software update for the request.

In some implementations, the update generation engine includes a language synthesis module 314. The language synthesis module generates new text to describe a task to be specified by manual correction instructions, e.g., when no existing text is specified by a static template. This is useful, for example, so that a developer does not need to generate new text to generate manual correction instructions for a new operation. Instead, the language synthesis module can analyze the kind of change made by the developer and generate new text that is descriptive of the change and consistent with the language and level of granularity used in the other static templates. The language synthesis module can be implemented using natural language processing (NLP).

Figure 4:
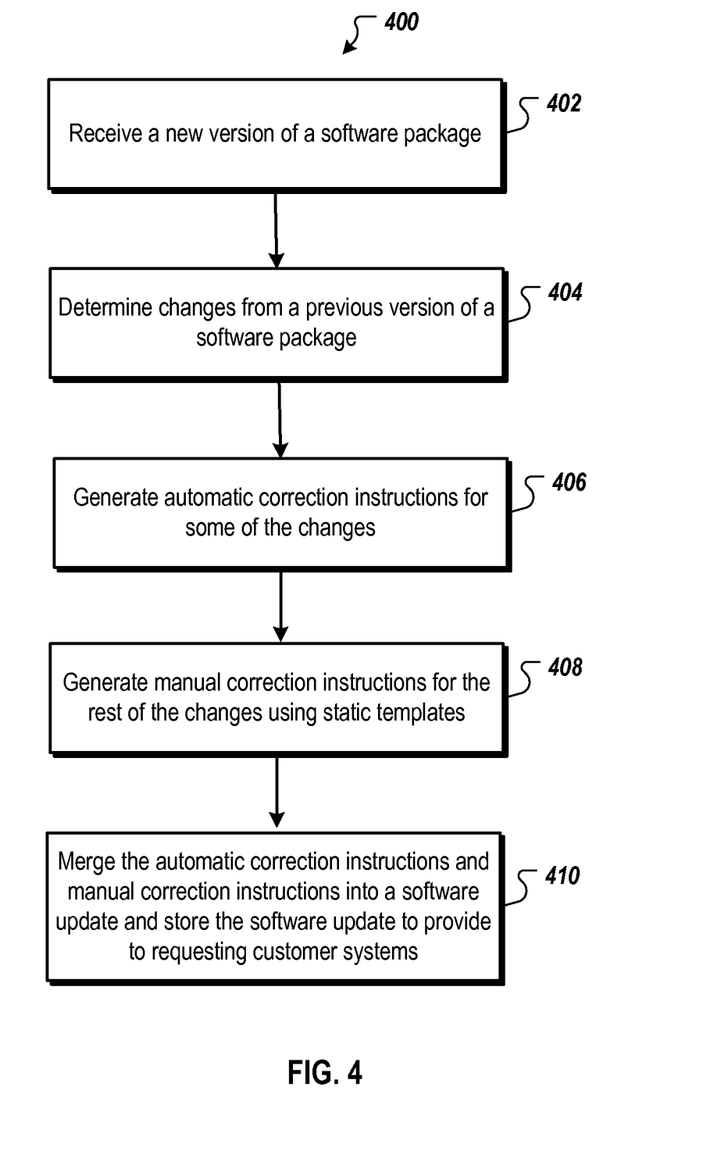
FIG. 4 is a flow chart that illustrates a method 400 for generating a software update.

FIG. 4 is a flow chart that illustrates a method 400 for generating a software update. For clarity of presentation, the description that follows generally describes the method 400 in the context of FIGS. 1-3 as performed by a system, e.g., the software update system 202 of FIG. 2. However, the method 400 may be performed, for example, by any other suitable system, environment, software, and hardware, or a combination of systems, environments, software, and hardware as appropriate.

In step 402, the software update system receives a new version of a software package from a developer. The new version can contain new or changed source code, new or changed data objects, or both. The new version can fix bugs or introduce new features or implement of types of changes.

In step 404, the software update system compares the new version of the software package with a stored version of the software package to determine a number of changes. The system then determines whether, for each change, automatic correction instructions can be generated for the change.

In step 406, the software update system generates automatic correction instructions for those changes where automatic correction instructions can be implemented. The automatic correction instructions can be executable code, e.g., as described above with reference to FIG. 3.

In step 408, the software update system generates manual correction instructions for those changes where automatic correction instructions cannot be implemented. For example, the changes can be changes to objects not supported by automatic correction instructions. The software update system generates the manual correction instructions using static templates, e.g., as described above with reference to FIG. 3.

In step 410, the software update system merges the automatic correction instructions and manual correction instructions into a software update. The software update system stores the software update so that, when a customer system requests the software update, the software update system can respond by providing the software update.

At a customer system, the software package can be updated by downloading the software update. The customer system itself implements the automatic correction instructions by executing code contained in the software update. The customer system then implements the manual correction instructions by displaying text of the manual correction instructions to a system operator who then completes the tasks specified by the manual correction instructions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIG. 4), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method of generating a software update for a software package, the method comprising:
   determining a plurality of changes between a previous version of the software package and a new version of the software package;
   for each change, determining whether the change can be implemented as one or more automatic correction instructions that can be executed by a client computer system, including determining that one or more first changes can be implemented as automatic correction instructions and that one or more second changes cannot be implemented as automatic correction instructions; generating one or more automatic correction instructions for the one or more first changes; generating one or more manual correction instructions for the one or more second changes, including, for each second change:
   i) identifying a corresponding template for a text string for the second change from a repository of templates, wherein the corresponding template includes a plurality of different text strings each in a different language and the text string is selected from the plurality of different text strings to match a specified language of a computer system requesting the software update,
   ii) populating the text string from the corresponding template with information specific to the second change, and
   iii) including the text string in the manual correction instruction;
   for a particular second change of the one or more second changes, determining that the corresponding template of the identified templates does not specify a corresponding text string; and
   in response to determining that the corresponding template does not specify the corresponding text string, analyzing the particular second change to generate a new text string that is consistent with the second change.

2. The method of claim 1, further comprising sending the automatic correction instructions, the manual correction instructions, and update instructions to a computer system storing the software package, wherein the computer system is configured to executing the update instructions, thereby causing the computer system to execute the automatic correction instructions to update the software package and to display the manual correction instructions.

3. The method of claim 1, wherein determining whether the change can be implemented as one or more automatic correction instructions that can be executed by a client computer system comprises:
   determining whether the change is a source code change or a change to a specified object on a list of objects;
   if the change is a source code change or a change to a specified object, determining that the change can be implemented in automatic correction instructions; and
   if the change is not a source code change or a change to a specified object, determining that the change cannot be implemented in automatic correction instructions.

4. The method of claim 1, wherein generating one or more automatic correction instructions for the one or more first changes comprises generating the automatic correction instructions so that, when executed by a computer system, the computer system will modify a stored copied of the previous version of the software package to correspond to the new version of the software package as specified by the change.

5. The method of claim 1, wherein the templates in the repository of templates are specified at a uniform level of granularity.

6. The method of claim 1, further comprising:
   determining that a first change lacks a corresponding template in the repository of templates; and
   generating a new template for the first change by analyzing the first change and applying natural language processing.

7. A non-transitory computer storage medium encoded with a computer program, the program comprising instructions that when executed by one or more computers cause the one or more computers to perform operations comprising:
   determining a plurality of changes between a previous version of a software package and a new version of the software package;
   for each change, determining whether the change can be implemented as one or more automatic correction instructions that can be executed by a client computer system, including determining that one or more first changes can be implemented as automatic correction instructions and that one or more second changes cannot be implemented as automatic correction instructions; generating one or more automatic correction instructions for the one or more first changes;
   generating one or more manual correction instructions for the one or more second changes, including, for each second change:
   i) identifying a corresponding template for a text string for the second change from a repository of templates, wherein the corresponding template includes a plurality of different text strings each in a different language and the text string is selected from the plurality of different text strings to match a specified language of a computer system requesting the software update,
   ii) populating the text string from the corresponding template with information specific to the second change, and
   iii) including the text string in the manual correction instruction;

for a particular second change of the one or more second changes, determining that the corresponding template of the identified templates does not specify a corresponding text string; and in response to determining that the corresponding template does not specify the corresponding text string, analyzing the particular second change to generate a new text string that is consistent with the second change.

8. The non-transitory computer storage medium of claim 7, the operations further comprising sending the automatic correction instructions, the manual correction instructions, and update instructions to a computer system storing the software package, wherein the computer system is configured to executing the update instructions, thereby causing the computer system to execute the automatic correction instructions to update the software package and to display the manual correction instructions.

9. The non-transitory computer storage medium of claim 7, wherein determining whether the change can be implemented as one or more automatic correction instructions that can be executed by a client computer system comprises:

determining whether the change is a source code change or a change to a specified object on a list of objects;

if the change is a source code change or a change to a specified object, determining that the change can be implemented in automatic correction instructions; and if the change is not a source code change or a change to a specified object, determining that the change cannot be implemented in automatic correction instructions.

10. The non-transitory computer storage medium of claim 7, wherein generating one or more automatic correction instructions for the one or more first changes comprises generating the automatic correction instructions so that, when executed by a computer system, the computer system will modify a stored copied of the previous version of the software package to correspond to the new version of the software package as specified by the change.

11. The non-transitory computer storage medium of claim 7, wherein the templates in the repository of templates are specified at a uniform level of granularity.

12. The non-transitory computer storage medium of claim 7, the operations further comprising:

determining that a first change lacks a corresponding template in the repository of templates; and generating a new template for the first change by analyzing the first change and applying natural language processing.

13. A system of one or more computers configured to perform operations comprising:

a non-transitory computer storage medium encoded with a computer program, the program comprising instructions that when executed by one or more computers cause the one or more computers to perform operations comprising:

determining a plurality of changes between a previous version of a software package and a new version of the software package;

for each change, determining whether the change can be implemented as one or more automatic correction instructions that can be executed by a client computer system, including determining that one or more first changes can be implemented as automatic correction instructions and that one or more second changes cannot be implemented as automatic correction instructions;

generating one or more automatic correction instructions for the one or more first changes;

generating one or more manual correction instructions for the one or more second changes, including, for each second change:

i) identifying a corresponding template for a text string for the second change from a repository of templates, wherein the corresponding template includes a plurality of different text strings each in a different language and the text string is selected from the plurality of different text strings to match a specified language of a computer system requesting the software update, ii) populating the text string from the corresponding template with information specific to the second change, and iii) including the text string in the manual correction instruction;

for a particular second change of the one or more second changes, determining that the corresponding template of the identified templates does not specify a corresponding text string; and in response to determining that the corresponding template does not specify the corresponding text string, analyzing the particular second change to generate a new text string that is consistent with the second change.

14. The system of claim 13, the operations further comprising sending the automatic correction instructions, the manual correction instructions, and update instructions to a computer system storing the software package, wherein the computer system is configured to executing the update instructions, thereby causing the computer system to execute the automatic correction instructions to update the software package and to display the manual correction instructions.

15. The system of claim 13, wherein determining whether the change can be implemented as one or more automatic correction instructions that can be executed by a client computer system comprises:

determining whether the change is a source code change or a change to a specified object on a list of objects;

if the change is a source code change or a change to a specified object, determining that the change can be implemented in automatic correction instructions; and if the change is not a source code change or a change to a specified object, determining that the change cannot be implemented in automatic correction instructions.

16. The system of claim 13, wherein identifying a corresponding template for a text string for the change from a repository of templates and including the text string in the manual correction instructions comprises populating the text string from the corresponding template with information specific to the change.

17. The method of claim 1, wherein generating the new text string includes generating the new text string that is i) descriptive of the particular second change, ii) consistent with a language of the second change, and ii) consistent with a level of granularity associated with the remaining identified templates.

* * * * *